(12) United States Patent
Huang et al.

(10) Patent No.: US 11,731,037 B2
(45) Date of Patent: Aug. 22, 2023

(54) RAPID TARGET SELECTION WITH PRIORITY ZONES

(71) Applicant: Riot Games, Inc., Los Angeles, CA (US)

(72) Inventors: Alexander Nixon Huang, Los Angeles, CA (US); Christina Norman, Los Angeles, CA (US)

(73) Assignee: Riot Games, Inc., Los Angeles, CA (US)

( * ) Notice: Subject to any disclaimer, the term of this patent is extended or adjusted under 35 U.S.C. 154(b) by 135 days.

(21) Appl. No.: 17/018,319

(22) Filed: Sep. 11, 2020

(65) Prior Publication Data
US 2022/0080299 A1 Mar. 17, 2022

(51) Int. Cl.
| | |
|---|---|
| A63F 13/214 | (2014.01) |
| G06F 3/0482 | (2013.01) |
| G06F 3/04883 | (2022.01) |
| A63F 13/20 | (2014.01) |

(52) U.S. Cl.
CPC ............ *A63F 13/214* (2014.09); *A63F 13/20* (2014.09); *G06F 3/0482* (2013.01); *G06F 3/04883* (2013.01)

(58) Field of Classification Search
CPC ...... A63F 13/214; A63F 13/20; G06F 3/0482; G06F 3/04883
See application file for complete search history.

(56) References Cited

U.S. PATENT DOCUMENTS

| | | | |
|---|---|---|---|
| 2006/0187196 A1 | 8/2006 | Underkoffler et al. | |
| 2013/0246975 A1* | 9/2013 | Oddiraju | G06F 3/04883 715/835 |
| 2014/0160073 A1* | 6/2014 | Matsuki | G06F 3/04886 345/173 |
| 2016/0026253 A1 | 1/2016 | Bradski et al. | |
| 2016/0370915 A1* | 12/2016 | Agarwal | G06F 3/0443 |
| 2017/0084084 A1 | 3/2017 | Durham et al. | |
| 2018/0028917 A1 | 2/2018 | Poerschke et al. | |
| 2019/0094981 A1 | 3/2019 | Bradski et al. | |

OTHER PUBLICATIONS

International Search Report and Written Opinion received for PCT Patent Application No. PCT/US2021/049659, dated Dec. 1, 2021, 6 pages.

* cited by examiner

*Primary Examiner* — Yingchuan Zhang
(74) *Attorney, Agent, or Firm* — Shook Hardy & Bacon

(57) ABSTRACT

In various examples, when a user presses a button to interact with an object while playing a mobile video game, a prioritization zone around a targeting reticle can be defined. If the user positions the prioritization zone on a group of objects, a set of prioritization rules are applied to identify high importance objects (e.g., game Champions) in the prioritization zone. Based on the prioritization rules, the system can select the identified high importance object found inside the prioritization zone that is closest to the targeting reticle. In some embodiments, the prioritization zone is activated only for a defined period of time after the user presses the attack button. If the user releases the attack button during the defined period of time, the system can identify any of the objects in the prioritization zone and select a high importance object to interact with (e.g., launch an attack).

20 Claims, 7 Drawing Sheets

RAPID TARGET SELECTION WITH PRIORITY ZONES

BACKGROUND

Users of mobile video games—such as a multiplayer online battle arena (MOBA)—often wish to interact with a single object in an area that contains many objects that are close to one another. For example, a user playing a mobile multiplayer online battle arena ("MOBA") game, such as League of Legends: Wild Rift®, can wish to launch an attack on a specific enemy unit that is surrounded by several other enemy units. In such instances, it can be difficult for the user to precisely select the specific enemy using a touch-input device (e.g., a mobile phone), thereby resulting in the user inadvertently attacking one of the several nearby enemy units. While a touch screen user interface (UI) can provide users with additional buttons to aid in interacting with objects that are close to one another, selecting one of the objects to interact with using these additional buttons can often be an unintuitive and time consuming task, especially when objects are very close to one another or when a user has little time to make a precise selection. As such, a user can accidentally select objects he or she does not wish to select, or the user can expend valuable time selecting objects using disparate buttons in a UI, either of which can be detrimental to the user during MOBA gameplay.

To account for this, conventional solutions provide users with the ability to position a targeting reticle using a touch interface, such as a virtual joystick or button. For example, a touch screen UI for a mobile game might include an attack button to allow a user to command his or her avatar to attack an opposing avatar (e.g., an enemy unit). When the attack button is pressed, a targeting reticle can appear beneath the user's avatar. The user can then move their finger across the touch screen to position the targeting reticle under the opposing avatar and release the attack button to launch an attack on the opposing avatar. While this solution does not require specific buttons for locking onto an opposing avatar to launch an attack, the user is still required to precisely maneuver the targeting reticle from his or her avatar to the opposing avatar in order to attack the opposing avatar. As a result, a user must still expend valuable game time to aim attacks on opposing avatars, which the user can not have during an intense battle sequence of a video game, such as League of Legends®.

SUMMARY

Embodiments of the present disclosure relate to selecting an object within a set of objects using a prioritization zone. For example, in some embodiments, a user playing a mobile video game (e.g., a mobile version of League of Legends) is provided with a touch screen UI that includes a set of buttons for commanding a user avatar (e.g., a user's "Champion") in a session of the video game. An attack button on the UI can be used by the user to command the user's avatar to attack an opposing team's units and/or structures (e.g., "Champions," "Minions," "Turrets," "Towers," "Inhibitors," "Nexus," etc.). In some embodiments, when the user presses the attack button, a prioritization zone around a targeting reticle is defined. The prioritization zone is an ergonomic area that is larger than the targeting reticle, centered on the targeting reticle, and defined by a set of boundary lines originating from a user avatar. If the user positions the prioritization zone on a group of units and/or structures, a set of prioritization rules are applied to identify high importance units (e.g., game Champions) in the prioritization zone. Based on the prioritization rules, the system can select (e.g., attack) the identified high importance unit found inside the prioritization zone that is closest to the targeting reticle. In some embodiments, the prioritization zone is activated only for a defined period of time after the user presses the attack button. If the user releases the attack button during the defined period of time, the system can identify any of the opposing team's units and structures in the prioritization zone and select a high importance unit to interact with (e.g., launch an attack). In this way, the user can quickly select high importance units (e.g., Champions) rather than less important units (e.g., Minions, Turrets, Towers, Inhibitors, Nexus, etc.) when a high importance unit is near a less important unit or when two high importance units are near one another. If the user does not release the attack button during the defined amount of time, the prioritization zone can deactivate and the user can move the targeting reticle to select any object the user wishes to select (e.g., a low importance unit). As such, and in contrast to conventional solutions, such as those described above, the user does not require additional or specific buttons for targeting or interacting with specific objects. Moreover, by limiting some prioritization rules to a certain amount of time and to a specific zone, users are able to quickly, accurately, and predictably select high priority units with gestures (e.g., flicking, sliding, etc.) on the touch screen without hindering the natural feeling of slower aiming gestures.

BRIEF DESCRIPTION OF THE DRAWINGS

The present systems and methods for selecting an object within a set of objects using prioritization logic and touch gestures are described in detail below with reference to the attached drawing figures, wherein.

DETAILED DESCRIPTION

Figure 1:
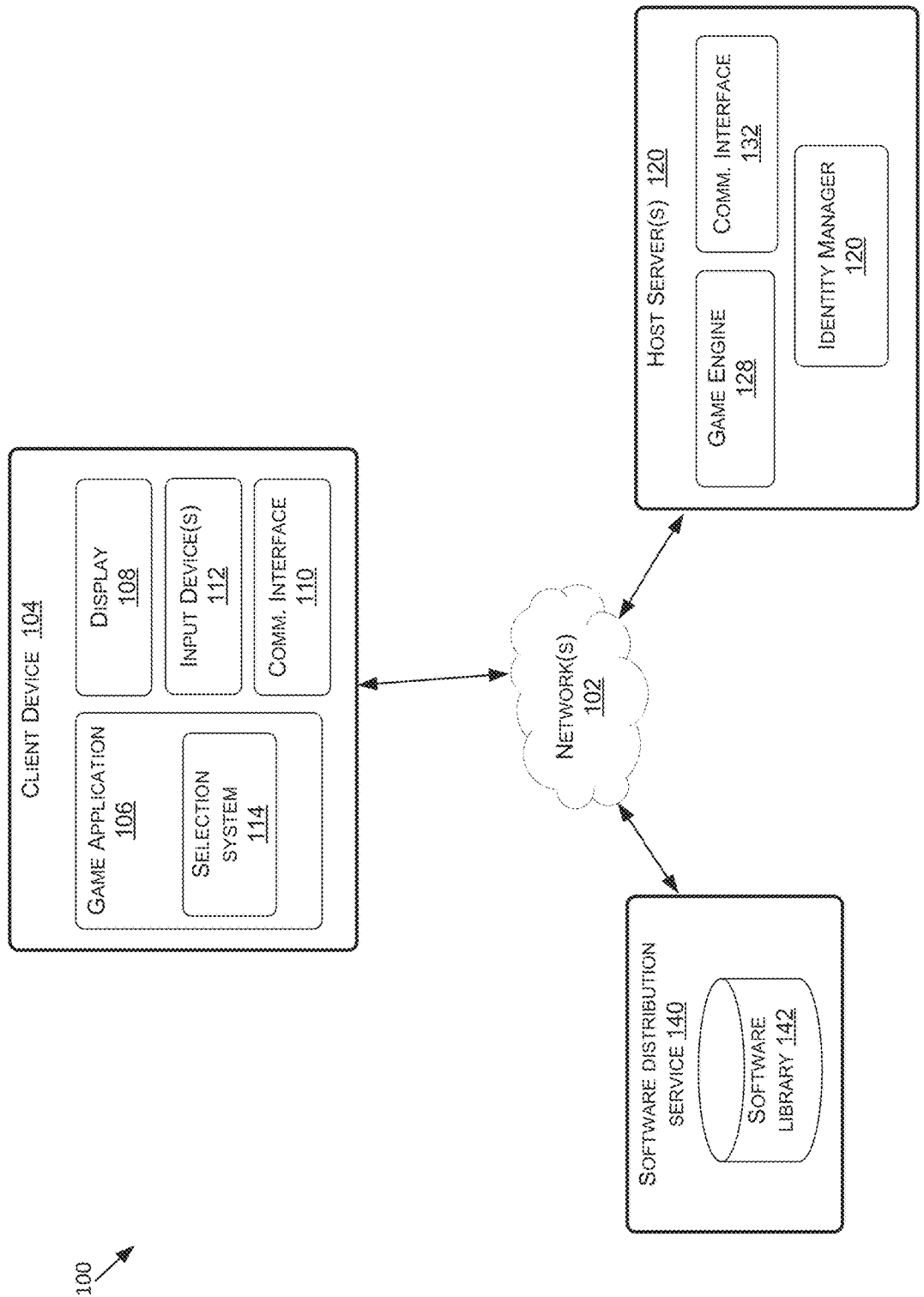
FIG. 1 is an example system diagram of a gaming system, in accordance with some embodiments of the present disclosure.

Systems and methods are disclosed relating to selecting an object within a set of objects using prioritization logic and touch gestures. Although primarily described herein with respect to gaming implementations, this is not intended to be limiting, and the systems and methods of the present disclosure can be implemented in any implementation for selecting an object within a set of objects using prioritization logic and touch gestures. For non-limiting examples, the systems and methods described herein can be implemented for simulation applications, virtual reality (VR) and/or augmented reality (AR) applications, modeling applications, content editing applications, or other applications.

In some embodiments, a user playing a touch-based video game (e.g., League of Legends: Wild Rift®) can be provided with a graphical user interface (GUI) on a mobile touch screen that includes game controls (e.g., buttons, directional pads, joystick) for interacting with objects and issuing commands in an environment of the mobile video game, such as controlling movements of a user avatar (e.g., a user's Champion) in an instance of gameplay. In some embodiments, the UI can include an attack button to receive input from a user. Input received via the attack button can command the user avatar to attack an opposing team's units and/or structures (e.g., "Champions," "Minions," "Turrets," "Towers," "Inhibitors," "Nexus," etc.). As used herein, an "attack" can refer to any interaction by a user with an object (e.g., player, avatar, structure, feature, item, widget, etc.) in the virtual environment of a video game.

In some embodiments, when a user presses and holds the attack button for a threshold amount of time, the system can generate a graphical targeting reticle (e.g., circle, crosshair, dot, mil-dot, etc.) that can operate as an aiming aid for the user. Once the targeting reticle has been generated, additional user input can be received to move the targeting reticle within the virtual environment. For example, based on determining that the user is pressing the attack button, the system can generate a virtual joystick in the location of the attack button, beneath the user's finger, to receive directional input for repositioning the targeting reticle. For example, a user in a video game who wishes to attack an opposing player can press and hold the attack button for a threshold amount of time to generate the targeting reticle. Once the targeting reticle has been generated, the user can move their finger across the UI to reposition a targeting reticle on the opposing player and release the attack button to attack the opposing player.

In some embodiments, when a user presses and holds the attack button, a prioritization zone around a targeting reticle can be defined. The prioritization zone can be defined only for a threshold amount of time while the user holds the attack button. The prioritization zone can be defined by a set of geometric properties (e.g., length, area, volume), which can rotate with the user's avatar based on input direction from the virtual joystick. In some examples, the prioritization zone can be an ergonomic area that is larger than the targeting reticle and can be centered on the targeting reticle.

If the user positions the prioritization zone on a group of units and/or structures and releases the attack button within a threshold amount of time, a set of prioritization rules are applied to identify high importance units (e.g., game Champions) in the prioritization zone. Based on the priority rules, the system can select (e.g., attack) the identified high importance unit found inside the prioritization zone that is closest to the targeting reticle. For example, if the user presses and holds the attack button, moves the prioritization zone onto a group of enemy units, and releases the attack button within a threshold amount of time, the system can apply the set of prioritization rules to the group of enemy units to identify the enemy units in the prioritization zone and select a high importance unit to attack.

In some embodiments the threshold amount of time can be very brief, requiring the user to quickly press the attack button, move the priority zone and release the attack button in order to utilize the priority zone—and prioritization rules—on the opposing team's group of units. For example, in some embodiments, the threshold amount of time can be limited to two game logic frames (e.g., 0.13 seconds) and, as such, allow the user only enough time to press the attack button and quickly move (e.g., flick, slide, swipe, fling, etc.) his or her finger in a desired direction and for a desired distance on the touch screen. As mentioned herein, if the user presses and holds the attack button beyond the threshold amount of time, the system can generate a graphical targeting reticle and the priority zone and set of prioritization rules can deactivate. Advantageously, by limiting the priority zone to a certain amount of time, users are able to quickly, accurately, and predictably select high priority units with gestures (e.g., flicking, sliding) on the touch screen without hindering the natural feeling of slower aiming commands using the targeting reticle. For purposes of the present disclosure, the term "finger" is not intended to be limiting, and it is contemplated that any capacitive device (e.g., a stylus) can be utilized to perform similar acts described herein in relation to a user's "finger." In some embodiments, the gestures described herein can be performed via components of a game pad or game controller. For example, a user can flick, slide, swipe, or fling a joystick in a desired direction and for a desired distance.

With reference to FIG. 1, FIG. 1 is an example system diagram of a gaming system 100, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by entities can be carried out by hardware, firmware, and/or software, or any combination thereof. For instance, various functions can be carried out by a processor executing instructions stored in memory. The gaming system 100 (and the components, features, and/or functionality thereof) can be implemented using one or more computing devices, such as example computing device 700 of FIG. 7, described in more detail below.

The gaming system 100 can include, among other things, client device 104, one or more host server(s) 120, and/or a software distribution service 140. Components of the gaming system 100 can communicate over network(s) 102. The network(s) can include a wide area network (WAN) (e.g., the Internet, a public switched telephone network (PSTN), a cellular network, etc.), a local area network (LAN) (e.g., Wi-Fi, Bluetooth, Bluetooth Low Energy (BLE), Ethernet, etc.), and/or another network type, such as those described herein. In any example, each of the components of the gaming system 100 can communicate with one or more of the other components via one or more of the network(s) 102.

As illustrated in FIG. 1, the host server(s) 120 can be separate or distinct from the software distribution service 140; however, this is not intended to be limiting. In some examples, the host server(s) 120 can be the same or similar servers to the software distribution service 140. In some examples, the host server(s) 120 can be operated or hosted by a first entity (e.g., a first company) and the software distribution service 140 can be operated or hosted by a second entity (e.g., a second, different company). In other examples, the host server(s) 120 and the software distribution service 140 can be operated and/or hosted by the same entity.

The host server(s) 120 can include one or more application programming interfaces (APIs) to enable communication of information (e.g., user profiles, game state data, etc.) with the client device 104. The host server(s) 120 can include a game engine 128, a communication interface 132, and an identity manager 120. In some embodiments, such as where the host server(s) 120 include an identity manager, the host server(s) 120 can correspond to an identity management (IDM) system. Although illustrated as a component of the host server(s) 120, this is not intended to be limiting. In some embodiments, the identity manager 120 can be hosted by a different server, such as an IDM server (not shown). For example, identity management information corresponding to a particular game application can be managed by a game developer of the game application. In such examples, the identity manager 120 can be hosted by one or more servers or other computing devices of the game developer.

The game engine 128 can include the functionality of a game that enables a game to be played by one or more users over a network. The game engine 128 can include a rendering engine, an audio engine, a physics engine, an animation engine, an artificial intelligence engine, a networking engine, a streaming engine, a memory management engine, and/or other components or features. The game engine 128 can be used to generate some or all game data while a user plays an instance of a game via, or in conjunction with, host server(s) 120.

The identity manager 120 can manage and store game information for a user including, but not limited to, digitally stored information about game settings, player or avatar customizations, progress and achievements in the game, state information (e.g., inventory, health, game physics, avatar locations, etc.) of a current game session (e.g., a current sports game, a current capture the flag game, etc.), etc. For example, as a user advances through levels in the game application 106, the user's progress in the game can be stored in association with the user's identity (e.g., username, gamer tag, etc.) in the identity manager 120. Further, the user's real-time condition in the instance of gameplay can be stored. For example, the user's position in a map of the game, a game clock, destruction to aspects of the map of the game, acquired weapons, avatar health of the user's avatar and other avatars can all be stored in association with the user's identity in the identity manager 120.

The communication interface 132 can include one or more components and features for communicating across one or more networks, such as the network(s) 102. The communication interface 132 can be configured to communicate via any number of network(s) 102, described herein. For example, to communicate in the gaming system 100 of FIG. 1, the host server(s) 120 can communicate over a LAN with other host server(s) 120 and/or over the Internet with the software distribution service 140 and/or the client device(s) 104.

The software distribution service 140 can manage the license (e.g., purchase, rental, lease, and/or loan) of video games or other software applications to a user. The software distribution service 140 can include a digital storefront, platform, or application through which users can acquire a license to video games or applications. The software distribution service 140 can also provide digital rights management (DRM) systems, limiting the use of software to one license per user account, for example.

The software distribution service 140 can further include a software library 142 that stores data files of software and provides access to these files. For example, a user can access the software library 142 via a mobile application store application via client device 104, which can include a catalog of available games or applications the user can purchase or access. The user can browse and/or search the catalog (e.g., via an API) and select a game or application they would like to purchase or access. Upon selection of a game, the user can purchase, lease, rent, or otherwise access the game via the mobile application store application of the software distribution service 140 and the game or application can begin downloading to the client device 104 from the software library 142.

The client devices 104 can include a smart phone, a laptop computer, a tablet computer, a desktop computer, a wearable device, a game console, a virtual reality (VR) or augmented reality (AR) system (e.g., a headset, a computer, a game console, remote(s), controller(s), and/or other components), a content streaming device a smart-home device that can include an intelligent personal assistant, and/or another type of device capable of supporting game play.

The client devices 104 can include a game application 106, a display 108, a communication interface 110, and/or an input device(s) 112. Although only a few components and/or features of the client device 104 are illustrated in FIG. 1, this is not intended to be limiting. For example, the client devices 104 can include additional or alternative components, such as those described below with respect to the computing device 700 of FIG. 7.

The game application 106 can be a mobile application, a computer application, a console application, and/or another type of application. The game application 106 can include instructions that, when executed by a processor(s), cause the processor(s) to, without limitation, receive input data representative of user inputs to the one or more input device(s) 112, store game data to the host server(s) 120 and/or the servers on the software distribution service 140 and/or the client device 104, retrieve game data from memory or local storage, receive the game data using the communication interface 110 from the host server(s) 120 and/or the servers on the software distribution service 140 and/or the client device 104, and cause display of the game on the display 108. In other words, the game application 106 can operate as a facilitator for enabling playing of a game associated with the game application on the client devices 104.

The game application 106 can be purchased (e.g., for a monetary value or for free) by a user from a software library 142 of the software distribution service 140. In any example, upon purchasing the game application 106, data files of the game application 106 can begin downloading to the client device 104. The game application 106 and/or patches or updates to the game application 106 can be downloaded from the software distribution service 140 or can be downloaded from another server(s), such as a server of a content delivery network (CDN). For example, the software distribution service 140 can be located in a different country or on a different continent, so to reduce the download time, the game application 106 and/or the patches or updates can be stored on different servers around the globe. As such, when the client devices 104 are downloading the game application 106 and/or the patches or updates, the client devices 104 can connect to a more local server that is part of the CDN, for example.

In some examples, such as where a local instance of a game is being executed, the client devices 104 can render the game using the game application 106 and hardware and/or software of the client device 104. In other examples, such as where the cloud-hosted instance of the game is being executed, the client device 104 can receive display data (e.g., encoded display data) and use the display data to display the game on the display 108. In examples where the display data is received by the client device (e.g., where the client device 104 does not generate the rendering), the gaming system 100 can be part of a game streaming system.

The game application 106 can include a selection system 114. The selection system 114 can include a prioritization anatomy that can include a set of prioritization rules for selecting objects in a virtual environment of the game application 106. For example, the selection system can receive inputs via input device(s) 112 of the client device 104 which can be used to interact with objects in a video game, as described herein further in relation to FIGS. 2 and 3. In any example, the selection system 114 can prioritize and select the object that is closest to a targeting reticle when more than one object can be selected after applying the set of prioritization rules.

The display 108 can include any type of display capable of displaying the game (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 can include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 112 of the client device 104.

The input device(s) 112 can include any type of devices that are capable of providing user inputs to the game. Embodiments described herein generally discuss the use of a touch-screen display; however this is not meant to be limiting. The input device(s) can further include a keyboard, a mouse, a controller(s), a remote(s), a headset (e.g., sensors of a virtual reality headset, or head mounted display (HMD)), a microphone, and/or other types of input devices.

The communication interface 110 can include one or more components and features for communicating across one or more networks, such as the network(s) 102. The communication interface 110 can be configured to communicate via any number of network(s) 102, described herein. For example, to communicate in the game state transfer system 100 of FIG. 1, the client devices 104 can use a cellular, Ethernet, or Wi-Fi connection through a router to access the Internet in order to communicate with the host server(s) 120 and/or the software distribution service 140.

Figure 2:
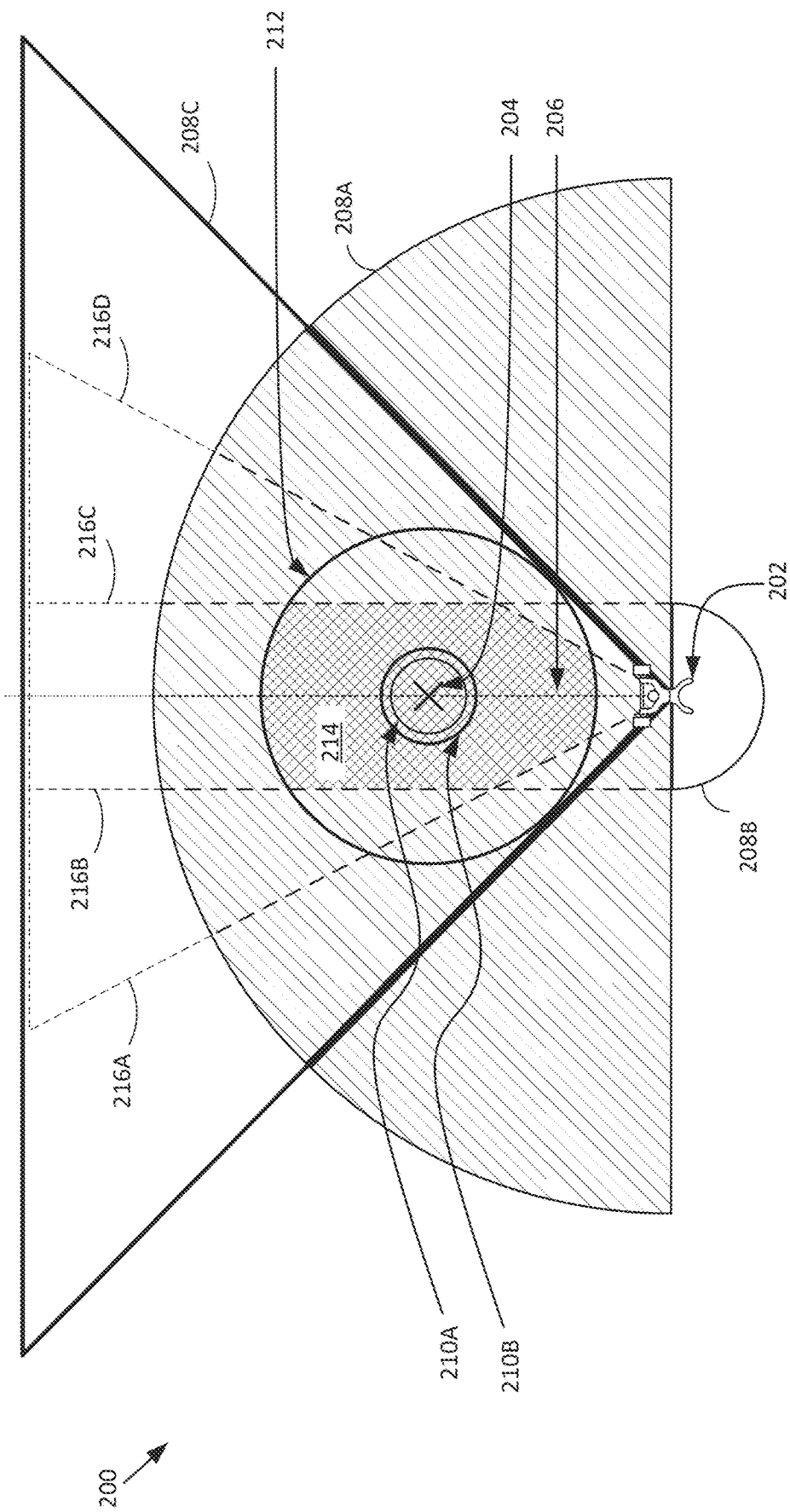
FIG. 2 is an example prioritization anatomy, in accordance with some embodiments of the present disclosure.

Now referring to FIG. 2, FIG. 2 is an example prioritization anatomy 200, in accordance with some embodiments of the present disclosure. The example prioritization anatomy 200 provides a visual representation of aspects of the prioritization logic associated with a set of prioritization rules, as described herein. The example prioritization anatomy 200 includes the user's avatar otherwise referred to as player 202, reticle 204, aim line 206, selection areas 208A, 208B and 208C (referred to collectively herein as "selection areas 208"), prioritization rings 210A and 210B, expanded focus zone 212, priority zone 214, and priority boundary/ies 216A, 216B, 216C, 216D (referred to collectively herein as "priority boundaries 216").

In operation, components of the prioritization anatomy 200 can move with the player 202, which is to say that as the player 202 moves throughout a game or application, at least some components of the prioritization anatomy 200 can move in relation to the movements of the player 202. For example, based on a received input direction from a user via a virtual joystick, or other input medium, to rotate or otherwise move the player 202 in an environment, selection areas 208 and priority boundaries 216 can move and/or rotate in relation to the movements of the player 202. In some embodiments, the prioritization anatomy 200 can move and/or rotate with the movements and rotations of the player 202 (e.g., relative to the facing direction of the player).

The reticle 204 can be a graphical targeting reticle, which can provide a user with a point of reference when looking at, selecting, or otherwise interacting with objects in an environment, such as a video game environment. For example, a user can place the reticle 204 over/on/above/below/under/at an opposing player unit in a video game to target an attack on the opposing player unit. In some embodiments, the reticle 204 can dynamically communicate gameplay information to a user via a graphical element. For example, if a user hovers the reticle 204 over an object, information regarding how the user can interact with the object (or information about the object) can be communicated to the user. In some embodiments, the reticle 204 can be displayed or hidden from display based on an input touch gesture. For example, during an initial period of time after a user presses an input button (e.g., attack button), the reticle 204 can be generated, but not displayed. After the initial period of time, the reticle 204 can be displayed to the user.

The reticle 204 can be constrained relative to the aim line 206 such that the reticle 204 can travel along the aim line 206. In some embodiments, the aim line can be limited to a defined distance from the player 202. For example, a video game developer can define a maximum focus point range which can specify the length of the aim line 206 for which the reticle 204 can travel. For example, the maximum focus point range can be 7.5 meters, which would limit the distance the user can move the reticle and, thus, limit the user to interacting with objects that are within 7.5 meters of the player 202. In some embodiments, a developer can specify that certain interactions be limited to a range that is less than the defined maximum focus point range. For example, although the maximum focus point range can be 7.5 meters, a developer can determine that the range for a special attack is limited to 4 meters from the player 202. While the reticle 204 and aim line 206 are depicted as being directly in front of the player 202, the aim line 206 can rotate about the player 202 to allow the reticle 204 to be positioned in any location within the selection areas 208A and 208B.

Prioritization ring 210A can be centered on the reticle 204 as the reticle 204 moves up and down the aim line 206. The prioritization ring 210A can be larger than the targeting reticle and provide a selection area to enable a user to select an object to interact with. For example, a user can intend to position the reticle 204 on an object, but the user can inadvertently place the reticle 204 only near the object, rather than directly on the object. In such example, the prioritization ring 210A operates to give the user a larger area to use to select the object the user wishes to interact with. In some embodiments, a set of prioritization rules can be associated with prioritization ring 210A. For example, if the user moves the reticle 204 into a position where the prioritization ring 210A is touching the player 202 and an object, the selection system 114 can select the player 202 if the action is capable of selecting player 202.

Similar to prioritization ring 210A, prioritization ring 210B can be centered on the reticle 204 as the reticle 204 moves up and down the aim line 206. The prioritization ring 210B can be larger than the targeting reticle and prioritization ring 210A. Prioritization ring 210B can also provide a selection area (e.g., similar to the prioritization ring 210A) to enable a user to select an object to interact with and can also operate to give the user a larger area to use to select the object the user wishes to interact with. In some embodiments, a set of prioritization rules can be associated with prioritization ring 210B. For example, if the user moves the reticle 204 into a position where the prioritization ring 210B is touching two objects that are associated with a different rank or priority, the object that ranks higher or is of a higher priority is selected.

In some embodiments, interacting with objects can be limited by selection areas 208. For example, users can only be able to interact with objects that are within selection areas 208A and 208B. Selection area 208A is a defined area in front of the player 202 and selection area 208B is a defined area behind the player 202. For example, selection area 208A can be a semicircle in front of the player 202 that is defined relative to the player 202, where a radius of the semicircle can extend at 90 degrees to the left and to the right of the player 202 for a defined distance (e.g., 8.7 meters) as shown in FIG. 2. By way of an additional example, selection area 208B can be a semicircle behind the player 202 that is defined relative to the player 202, where a radius of the semicircle can extend at 90 degrees to the left and to the right of the player 202 for a defined distance (e.g., 1.5 meters). As can be seen in FIG. 2, selection area 208A can be larger than selection area 208B. In operation, objects that are within the selection areas 208A and 208B can be considered for selection to allow for the user to interact with the object. For example, in a video game, a user can launch an attack on an opposing team unit that is within selection areas 208A and 208B, but the user can not launch an attack on an opposing team unit that is outside of selection areas 208A and 208B.

In some embodiments, interactions with objects in the selection areas 208 can be further limited by object data associated with an object. Each object in a video game or application can be associated with object data that can be stored in client device 104 or at host server(s) 120 such that client device 104 can receive or retrieve the object data. The object data can include, but is not limited to, name, rank, priority, class, category, health status, stamina status, experience, reputation, battle statistics, defensive statistics, offensive statistics, defensive abilities, offensive abilities, weapon types, and/or other characteristics that can be attributed to an object. In some embodiments, for a user to interact with a category of objects, the object must be within both selection area 208A and 208C. For example, when a user selects to interact with an object, the selection system 114 can determine the position of the object relative to the prioritization anatomy 200 and can access a set of object data associated with the object. Based on the position of the object and the object data associated with the object, the selection system can determine whether the user can interact with the object. For example, a game developer can designate that certain deployable units (e.g., plants and wards in the video game League of Legends) in a game must be within both the selection area 208A and the selection area 208C in order for a user to interact with the deployable units.

A priority zone 214 can also be generated around the reticle 204. A shape of the priority zone 214 can be generated based on the expanded focus zone 212 and the priority boundaries 216. For example, the priority zone 214 can be defined as the area within the expanded focus zone 212 as limited by the priority boundaries 216. As shown in FIG. 2, priority boundaries 216A and 216D can define a triangular area or cone originating from player 202, while priority boundaries 216B and 216C can be parallel lines that extend forward in the direction the player 202 is facing. As can be viewed and appreciated in FIG. 2, as the reticle 204 moves up or down the aim line 206, the lower portion (e.g., cone portion) of the priority zone 214 can change shape. For example, as the reticle 204 moves upward, the area of the priority zone 214 can increase due to the relative expansion of priority boundaries 216A and 216D as the reticle 204 gets further away from player 202. A location to apply the priority zone 214 can be determined based on a received touch gesture. For example, if a user moves their finger a given distance and direction during a touch gesture, the priority zone 214 can move a corresponding distance and direction away from the player 202.

The priority zone 214 can access object data associated with objects within the priority zone 214 and select the priority objects (i.e., high importance objects) within the area of the priority zone 214. For example, when a user moves the reticle 204 to an area in an environment, there can be several objects in the area the user can be able to interact with. To select an object to interact with, the selection system 114 can access object data associated with the objects in the priority zone 214 and determine a priority object to interact with. In some embodiments, a game developer can define a category of priority objects that can be selected by the selection system 114 in the priority zone 214. For example, a game developer can determine that only a class of opposing team units (e.g., champions) can be selected from a set of opposing team units detected in the area of the priority zone 214.

In some embodiments, the priority zone 214 can be activated for a period of time and then can be deactivated after the period of time has expired. For example, at the moment a user activates the reticle 204 (e.g., selecting an attack button or other input), the priority zone 214 can activate. Then, for the period of time, the user can move the reticle 204 along the aim line 206 and the prioritization zone can move relative to the reticle 204. If, for example, the selection system 114 receives an input (e.g., release attack button) to select an object during that period of time, the selection system 114 can determine all the objects within the priority zone 214 and access the object data associated with each of the objects in the priority zone 214 and determine a priority object to interact with if there is a priority object within the priority zone. In some embodiments, if, during this period of time, there is no priority object within the priority zone 214, then the selection system 114 can select no objects. If the selection system 114 does not receive an input to select an object during the period of time, the priority zone 214 can deactivate and remaining priority rules of the prioritization anatomy 200 will be applied. Note that while the priority zone 214 is active, the priority rules associated with the priority zone can take precedent over other priority rules of the prioritization anatomy 200.

In some embodiments, components of the prioritization anatomy 200 can or might not be displayed to the user. For example, during the period of time when the priority zone 214 is activated, none of the components of the prioritization anatomy 200 can be displayed to the user. Not displaying the components of the prioritization anatomy 200 can be advantageous in some embodiments because displaying too much information to the user can be confusing. For example, during an intense battle session of a video game, displaying the priority zone 214 can clutter the display and distract the user. Instead, the user can simply press the attack button and flick the user's finger in a desired direction to launch an attack on an enemy priority unit without a visual indication of the area of the priority zone 214. As the area of the priority zone 214 can be relatively large compared to a visible area of a gaming environment, the user can not need to see the priority zone 214 in order to accurately launch attacks on enemy priority units. In further embodiments, the reticle 204 can be displayed to the user after a period of time has expired. For example, after the priority zone has been deactivated, the reticle 204 can be displayed to the user to allow the user to precisely move the reticle 204 using a virtual joystick (e.g., a virtual joystick can be generated below the attack button after the user presses the attack button). The examples provided herein are not intended to be limiting and any combination of components of the prioritization anatomy 200 can be displayed for, or hidden from, the user.

The period of time when the priority zone 214 is active can be defined in relation to time or in relation to frames of the game. For example, a game developer can specify that the priority zone 214 can be active for 0.13 seconds after a user presses an attack button. Alternatively, or additionally, the game developer can specify that the priority zone 214 can be active for a number of game logic frames (e.g., 15 game logic frames). Game logic frames, as used herein, refers to simulation update frames of video game. For example, a game simulation can update 15 times per second, which would equate to 15 game logic frames per second. In some embodiments, a user can specify an amount of time, or number of game logic frames, during which the priority zone 214 can be active.

Figure 3:
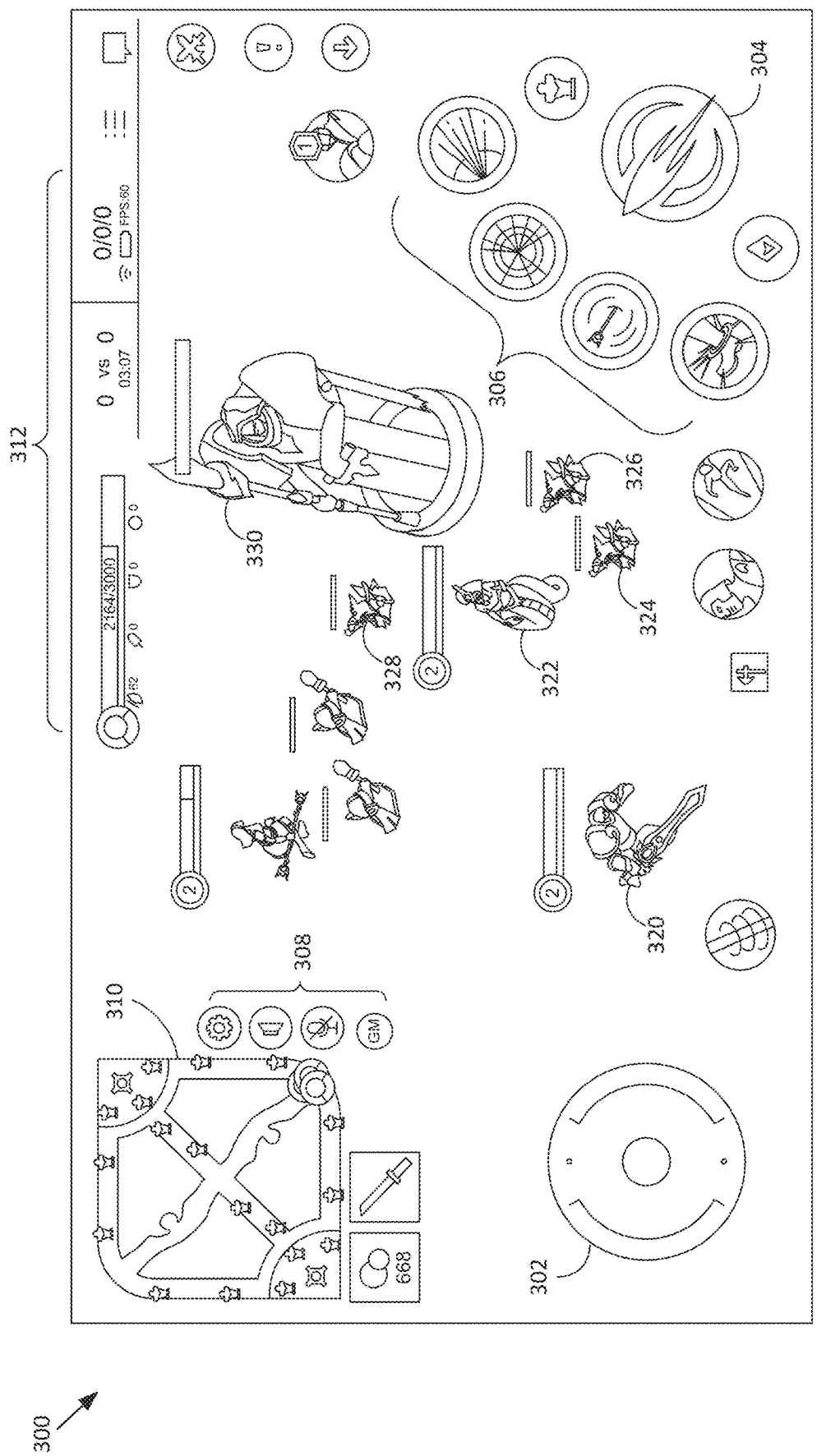
FIG. 3 is an example graphical user interface for playing a video game, in accordance with some embodiments of the present disclosure.

Now referring to FIG. 3, FIG. 3 is an example GUI 300 for playing a video game, in accordance with some embodiments of the present disclosure. The example GUI 300 includes graphic input elements, which can receive user input. The graphic input elements comprise a control pad 302 (e.g., for moving about the virtual environment), attack button 304 (e.g., to launch an attack), additional input buttons 306, and game settings buttons 308 (e.g., for adjusting settings of an instance of gameplay). The example GUI 300 can also include game map 310 (e.g., to view the location of objects within the game environment), game statistic elements 312, as well as several team units. Some team units in the example GUI 300 include champion 320, champion 322, minion 324, minion 326, minion 328, and tower 330.

The graphic input elements can be ergonomically located on a touch screen displaying the example GUI 300 to accommodate different hand sizes and methods of holding or interacting with a touch screen device, such as client device 104. The graphic input elements location can be dynamically adjusted to accommodate individual users hand size, preferred hand location, preferred interaction style, and grip style. Location can be adjusted based on how the user is holding or interacting with the touch screen device. For example, the user can access a customization interface to move the graphic input elements around and resize them as desired.

In some embodiments, a video game can provide a user with a virtual environment (e.g., level, map, area, stage, world, track, board, floor, zone, phase, mission, episode, course, etc.), such as the environment depicted in GUI 300, which can include an amount of space available to the user to complete an objective during an instance of gameplay. For example, a video game can include a virtual field that includes defined areas where opponents can battle against each other in an attempt to eliminate the opposing player(s).

In some embodiments, a user may, using the graphic user input elements, launch an attack on a unit of an opposing team using the priority zone 214 of the prioritization anatomy 200 of FIG. 2. For example, a user playing an instance of a video game can be in control of champion 320. Using control pad, 302, the user can move the champion 320 into position to launch an attack on an opposing team's units, which can include champion 322, minion 324, minion 326, minion 328, and tower 330. Once in position, if the user wishes to launch an attack on champion 322 using the priority zone 214, the user can press the attack button 304, at which point a virtual joystick can be generated and presented below the attack button 304 to receive directional input from the user.

The user can then perform a touch gesture by sliding his or her finger to move the reticle and priority zone from the champion 320 to champion 322. If the user releases his or her finger before a threshold amount of time (e.g., a period of time as discussed in FIG. 2.), the set of prioritization rules for the priority zone 214 can be applied to the area of the priority zone corresponding to the area of the gaming environment where the user positioned the priority zone 214 (e.g., over the champion 322). As discussed herein, based on determining that the user released the attack button within the threshold amount of time, the selection system 114 can determine that the opposing team units within the area of the priority zone can include champion 322, minion 324, minion 326, minion 328, and tower 330. The selection system can then access object data associated with the opposing team units to determine which unit to select (e.g., to receive the user's attack). For example, in embodiments where only a champion can be selected by the priority zone, the selection system 114 can access the object data of each of the opposing team units locate in the priority zone 214 and determine that champion 322 can be selected. Based on determining that champion 322 can be selected, the user's attack can be launched on champion 322.

In some embodiments, when an object has been selected, a graphic indication can be presented to the user via GUI 300 to indicate that the object has been selected. For example, when an attack is launched on an opposing team unit, the opposing team unit can be highlighted (e.g., a graphical element can be generated on or around the opposing team unit) for a moment. This can be provided as a confirmation to the user that the user's attack successfully landed on the opposing team unit.

Embodiments described herein can be applied to a mobile video game, such as a mobile version of League of Legends. However, this example mobile video game is not intended to limit the scope of this patent. Rather, the inventors have contemplated that the claimed subject matter might also be embodied in other ways, to include different steps or combinations of steps similar to the ones described in this document.

Generally, League of Legends® is a multiplayer online battle arena (MOBA) game in a three dimensional isometric perspective. Opposing teams consisting of multiple players can compete in matches to achieve a victory condition (e.g., destroying a core building—called a "Nexus"—in a base of the opposing team after bypassing a series of defensive structures (e.g., "Turrets" or "Towers")).

In some instances of gameplay, users can control avatars called "Champions," which each have a set of abilities and/or attributes which can be stored in an object database in association with each Champion. Users can choose or can be assigned Champions before the start of each instance of gameplay (i.e., match, round, session, etc.). Each user Champion can begin an instance of gameplay at a low experience level, and can gain experience during the instance of gameplay to increase their experience level. Increased experience levels can allow users to unlock a Champion's unique set of abilities and/or attributes. In some embodiments, at the beginning of each instance of gameplay, each Champion can start with a health level of one hundred percent. If a Champion loses all their health, the champion can be defeated, but can be automatically revived at a base associated with the Champion after a given amount of time. In further embodiments, each user Champion can also begin each instance of gameplay with a low amount of gold, and in addition to being given gold by the game over time by default, users can earn gold throughout the instance of gameplay in a variety of ways, such as by eliminating non-player characters known as "Minions" and "Monsters," by eliminating or helping to eliminate enemy player Champions, by destroying enemy structures and through unique item interactions or Champion abilities. Gold can be spent throughout the instance of gameplay to buy in-game items that further augment each Champion's abilities and gameplay, such as increasing stats (e.g., health, ability power, spells, etc.) Further, champion experience, gold earned, and items bought can be specific to each instance of gameplay and might not carry over to a subsequent instance of gameplay.

In some embodiments, users can earn rewards throughout one or more instances of gameplay that can be applied to a user account associated with the user and stored in an IDM server. A user's account can begin at an entry level (e.g., one on a given level scale) and can progress upward as instances of the game are played. User account level can be separate from character and/or Champion level. For example, a user with a user account level 30 and a user with a user account level 5 can each begin an instance of a game at a character level 1.

User accounts can be given a ranking based on a ranking system (e.g., the Elo rating system). A user ranking can be used to match user accounts of comparable skill level on each team in each instance of gameplay.

A "Tower" (e.g., also called a turret) can be a heavy fortification unit that can automatically attack enemy units if the enemy enters an attack zone of the tower. Towers can be an important unit of League of Legends. A tower can deal damage to enemy unites and provide vision to a user's team, allowing the team to better control a battlefield. Turrets can target one unit at a time and deal heavy damage. Opposing teams must destroy enemy towers to push their assault into enemy territory.

Figure 4:
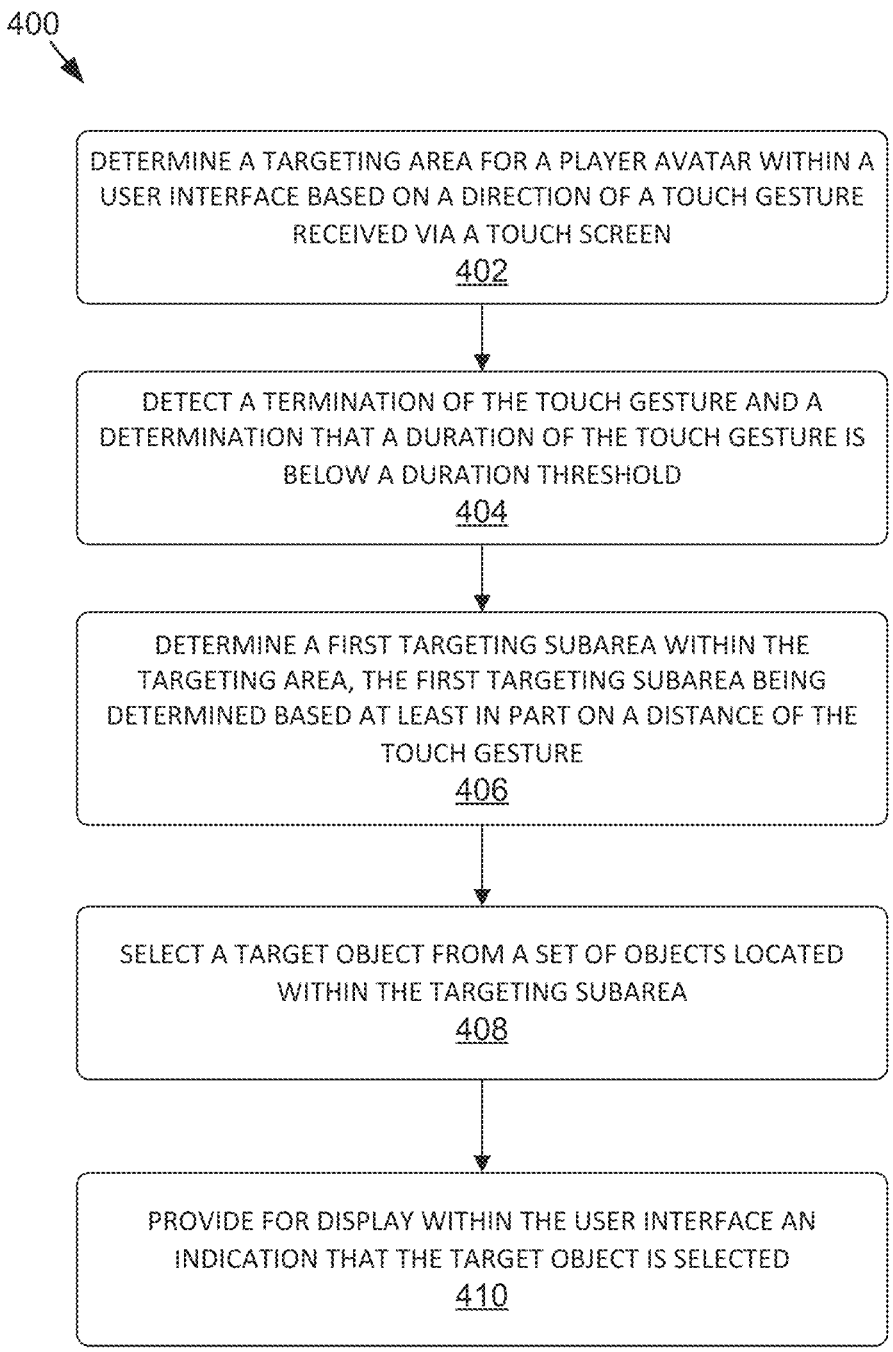
FIG. 4 is a flow diagram showing a method for selecting a target object from a set of objects located within the targeting subarea, in accordance with some embodiments of the present disclosure.
Figure 5:
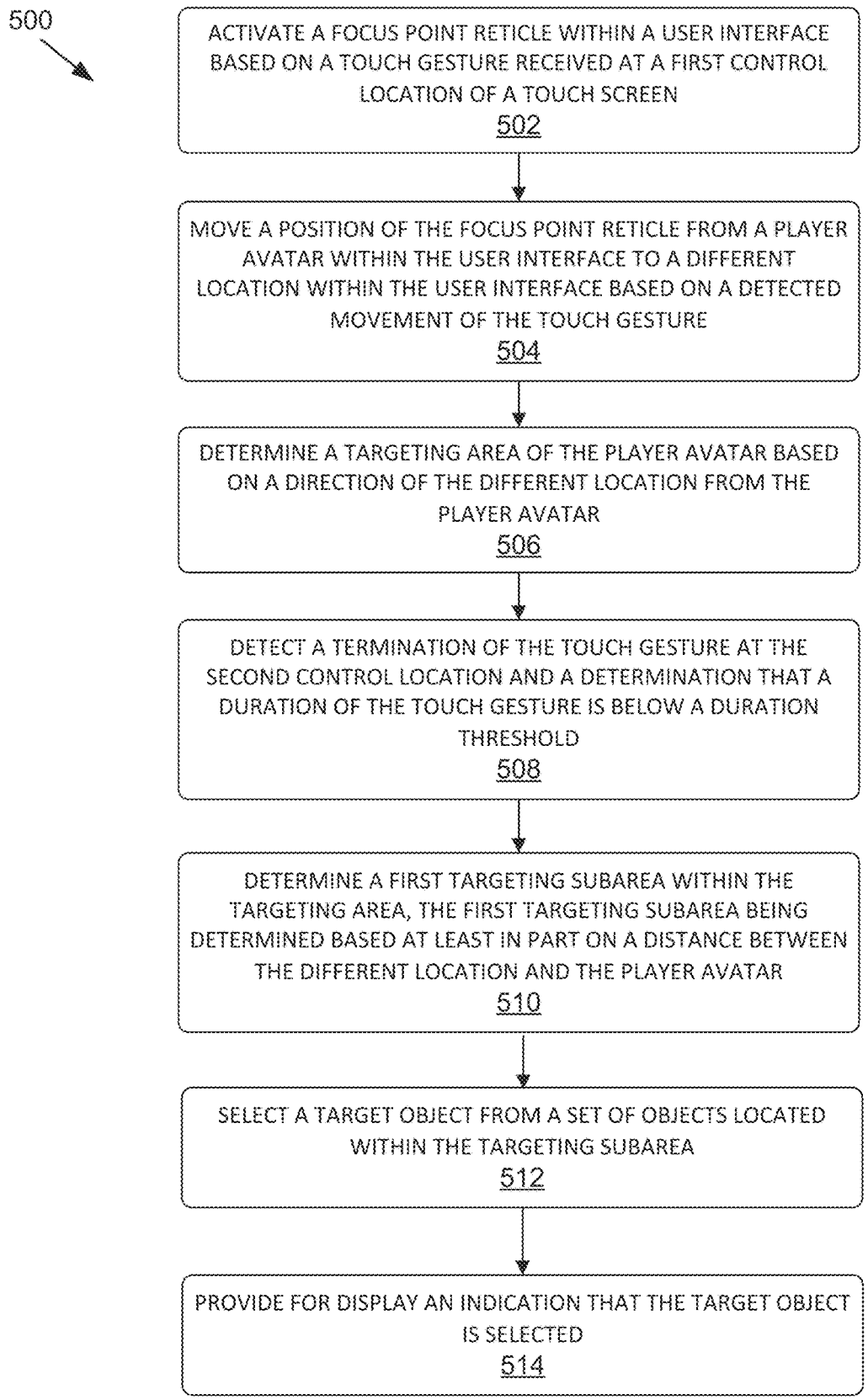
FIG. 5 is a flow diagram showing a method for activating a focus point reticle within a user interface and selecting a target object from a set of objects located within a targeting subarea, in accordance with some embodiments of the present disclosure.
Figure 6:
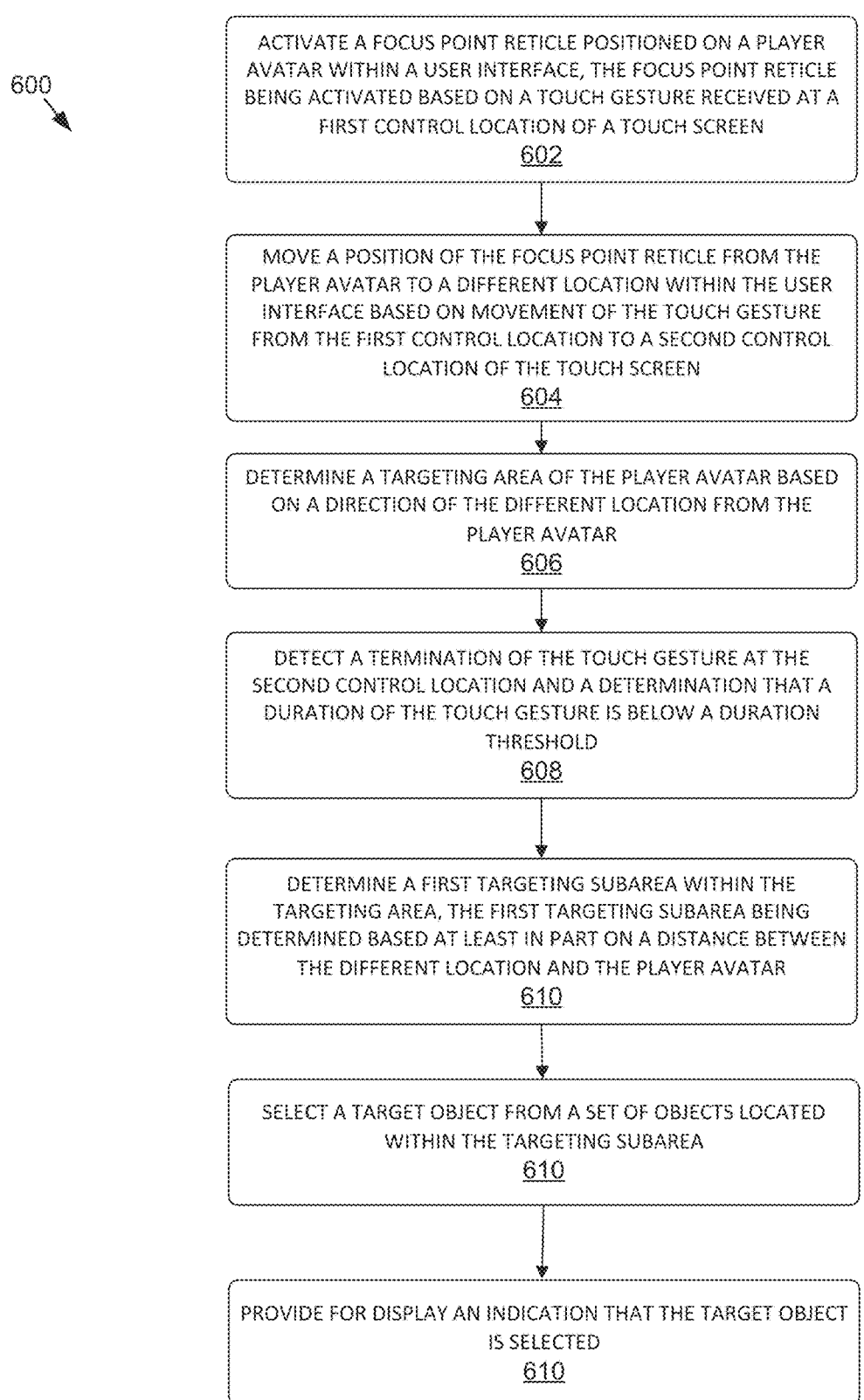
FIG. 6 is a flow diagram showing a method for moving a position of a focus point reticle and selecting a target object from a set of objects located within the targeting subarea, in accordance with some embodiments of the present disclosure.

Now referring to FIGS. 4, 5, and 6, each block of methods 400, 500, and 600, described herein, comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. In addition, methods 400, 500, and 600 are described, by way of example, with respect to the system of FIG. 1. However, these methods can additionally or alternatively be executed by any one system, or any combination of systems, including, but not limited to, those described herein.

FIG. 4 is a flow diagram showing a method 400 for selecting a target object from a set of objects located within the targeting subarea, in accordance with some embodiments of the present disclosure. The method 400, at block 402, includes determining a targeting area for a player avatar within a user interface based on a direction of a touch gesture received via a touch screen. For example, a touch gesture can include a user pressing an attack button with a user's finger, holding the attack button and moving the user's finger in a desired direction.

The method 400, at block 404 includes detecting a termination of the touch gesture and a determination that a duration of the touch gesture is below a duration threshold. For example, in some embodiments, the threshold amount of time can be limited to two game logic frames (e.g., 0.13 seconds) and, as such, allow the user only enough time to press the attack button and quickly move (e.g., flick, slide, swipe, fling, etc.) the user's finger in a desired direction and for a desired distance on the touch screen.

The method 400, at block 406 includes determining a first targeting subarea within the targeting area, the first targeting subarea being determined based at least in part on a distance of the touch gesture. For example, a shape of the priority zone 214 can be generated based on the expanded focus zone 212 and the priority boundaries 216. For example, the priority zone 214 can be defined as the area within the expanded focus zone 212 as limited by the priority boundaries 216.

The method 400, at block 408 includes selecting a target object from a set of objects located within the targeting subarea. For example, to select an object to interact with, the selection system 114 can access object data associated with the objects in the priority zone 214 and determine a priority object to interact with. For example, a game developer can determine that only a class of opposing team units (e.g., champions) can be selected from a set of opposing team units detected in the area of the priority zone 214.

The method 400, at block 410 includes providing for display within the user interface an indication that the target object is selected. For example, when an attack is launched on an opposing team unit, the opposing team unit can be highlighted (e.g., a graphical element can be generated on or around the opposing team unit) for a moment. This can be provided as a confirmation to the user that the user's attack successfully landed on the opposing team unit.

FIG. 5 is a flow diagram showing a method 500 for activating a focus point reticle within a user interface and selecting a target object from a set of objects located within a targeting subarea, in accordance with some embodiments of the present disclosure. The method 500, at block 502, includes activating a focus point reticle within a user interface based on a touch gesture received at a first control location of a touch screen. For example, in some embodiments, the reticle 204 can be activated and either displayed or hidden from display based on an input touch gesture. For example, during an initial period of time after a user presses an input button (e.g., attack button), the reticle 204 can be generated, but not displayed. After the initial period of time, the reticle 204 can be displayed to the user.

The method 500, at block 504, includes moving a position of the focus point reticle from a player avatar within the user interface to a different location within the user interface based on a detected movement of the touch gesture. For example, the user can perform a touch gesture by sliding the user's finger to move the reticle and priority zone from the champion 320 to champion 322.

The method 500, at block 506, includes determining a targeting area of the player avatar based on a direction of the different location from the player avatar. For example, based on a received input direction from a user via a virtual joystick, or other input medium, to rotate or otherwise move the player 202 in an environment, selection areas 208 and priority boundaries 216 can move in relation to the movements of the player 202.

The method 500, at block 508, includes detecting a termination of the touch gesture and a determination that a duration of the touch gesture is below a duration threshold. For example, in some embodiments, the threshold amount of time can be limited to two game logic frames (e.g., 0.13 seconds) and, as such, allow the user only enough time to press the attack button and quickly move (e.g., flick, slide, swipe, fling, etc.) the user's finger in a desired direction and for a desired distance on the touch screen.

The method 500, at block 510, includes determining a first targeting subarea within the targeting area, the first targeting subarea being determined based at least in part on a distance between the different location and the player avatar. For example, a location to apply the priority zone 214 can be determined based on a received touch gesture. For example, if a user moves their finger a given distance and direction during a touch gesture, the priority zone 214 can move a corresponding distance and direction away from the player 202. Further, as the reticle 204 moves upward, the area of the priority zone 214 can increase due to the relative expansion of priority boundaries 216A and 216D as the reticle 204 gets further away from player 202.

The method 500, at block 512, includes selecting a target object from a set of objects located within the targeting subarea. For example, to select an object to interact with, the selection system 114 can access object data associated with the objects in the priority zone 214 and determine a priority object to interact with. For example, a game developer can determine that only a class of opposing team units (e.g., champions) can be selected from a set of opposing team units detected in the area of the priority zone 214.

The method 500, at block 514, includes providing for display within the user interface an indication that the target object is selected. For example, when an attack is launched on an opposing team unit, the opposing team unit can be highlighted (e.g., a graphical element can be generated on or around the opposing team unit) for a moment. This can be provided as a confirmation to the user that the user's attack successfully landed on the opposing team unit.

FIG. 6 is a flow diagram showing a method 600 for moving a position of a focus point reticle and selecting a target object from a set of objects located within the targeting subarea, in accordance with some embodiments of the present disclosure. The method 600, at block 602, includes activating a focus point reticle positioned on a player avatar within a user interface, the focus point reticle being activated based on a touch gesture received at a first control location of a touch screen. For example, during an initial period of time after a user presses an input button (e.g., attack button), the reticle 204 can be generated, but not displayed. After the initial period of time, the reticle 204 can be displayed to the user.

The method 600, at block 604, includes moving a position of the focus point reticle from the player avatar to a different location within the user interface based on movement of the touch gesture from the first control location to a second control location of the touch screen. For example, the user can perform a touch gesture by sliding the user's finger to move the reticle and priority zone from the champion 320 to champion 322.

The method 600, at block 606, includes determining a targeting area of the player avatar based on a direction of the different location from the player avatar. For example, based on a received input direction from a user via a virtual joystick, or other input medium, to rotate or otherwise move the player 202 in an environment, selection areas 208 and priority boundaries 216 can move in relation to the movements of the player 202.

The method 600, at block 608, includes detecting a termination of the touch gesture and a determination that a duration of the touch gesture is below a duration threshold. For example, in some embodiments, the threshold amount of time can be limited to two game logic frames (e.g., 0.13 seconds) and, as such, allow the user only enough time to press the attack button and quickly move (e.g., flick, slide, swipe, fling, etc.) the user's finger in a desired direction and for a desired distance on the touch screen.

The method 600, at block 610, includes determining a first targeting subarea within the targeting area, the first targeting subarea being determined based at least in part on a distance between the different location and the player avatar. For example, a location to apply the priority zone 214 can be determined based on a received touch gesture. For example, if a user moves their finger a given distance and direction during a touch gesture, the priority zone 214 can move a corresponding distance and direction away from the player 202. Further, as the reticle 204 moves upward, the area of the priority zone 214 can increase due to the relative expansion of priority boundaries 216A and 216D as the reticle 204 gets further away from player 202.

The method 600, at block 612, includes selecting a target object from a set of objects located within the targeting subarea. For example, to select an object to interact with, the selection system 114 can access object data associated with the objects in the priority zone 214 and determine a priority object to interact with. For example, a game developer can determine that only a class of opposing team units (e.g., champions) can be selected from a set of opposing team units detected in the area of the priority zone 214.

The method 600, at block 612, includes providing for display within the user interface an indication that the target object is selected. For example, when an attack is launched on an opposing team unit, the opposing team unit can be highlighted (e.g., a graphical element can be generated on or around the opposing team unit) for a moment. This can be provided as a confirmation to the user that the user's attack successfully landed on the opposing team unit.

Although various examples are described herein with respect to video games and multiplayer online battle arena (MOBA) type games in particular, this is not intended to be limiting and can apply to various competitive and/or cooperative games, and eSports games that can include, without limitation, racing, sports simulation, real-time strategy, collectible card game simulations, massively multiplayer online games, platform games, etc. For example, priority selection operations can include, for a sports simulation game, selecting a player on a field or court to pass a ball to who has the highest statistics compared to other players in a priority zone. Embodiments are also not limited to video games and gaming applications. Other suitable embodiments include applications that would benefit from prioritized selection capabilities based on user gestures and object data associated with each object in a priority zone. These applications can include, without limitation, graphical content creation or design applications (e.g., 3D modeling and CAD applications), simulation, video processing or encoding, and deep learning (e.g., training and/or ground truth generation) applications.

Figure 7:
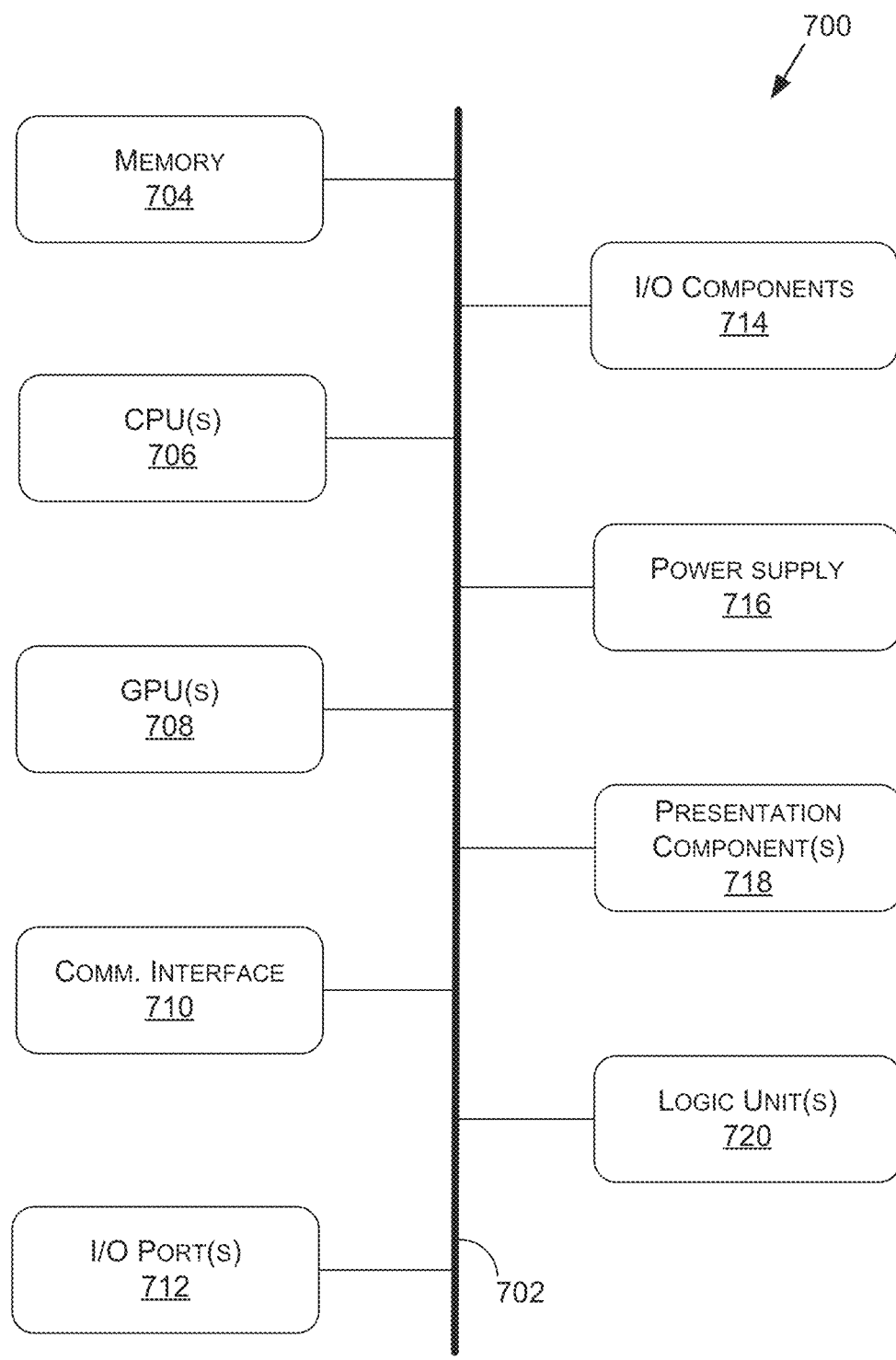
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 can include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720.

Although the various blocks of FIG. 7 are shown as connected via the interconnect system 702 with lines, this is not intended to be limiting and is for clarity only. For example, in some embodiments, a presentation component 718, such as a display device, can be considered an I/O component 714 (e.g., if the display is a touch screen). As another example, the CPUs 706 and/or GPUs 708 can include memory (e.g., the memory 704 can be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 can represent one or more links or busses, such as an address bus, a data bus, a control bus, or a combination thereof. The interconnect system 702 can include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 can be directly connected to the memory 704. Further, the CPU 706 can be directly connected to the GPU 708. Where there is direct, or point-to-point connection between components, the interconnect system 702 can include a PCIe link to carry out the connection. In these examples, a PCI bus need not be included in the computing device 700.

The memory 704 can include any of a variety of computer-readable media. The computer-readable media can be any available media that can be accessed by the computing device 700. The computer-readable media can include both volatile and nonvolatile media, and removable and non-removable media. By way of example, and not limitation, the computer-readable media can comprise computer-storage media and communication media.

The computer-storage media can include both volatile and nonvolatile media and/or removable and non-removable media implemented in any method or technology for storage of information such as computer-readable instructions, data structures, program modules, and/or other data types. For example, the memory 704 can store computer-readable instructions (e.g., that represent a program(s) and/or a program element(s), such as an operating system. Computer-storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. As used herein, computer storage media does not comprise signals per se.

The computer storage media can embody computer-readable instructions, data structures, program modules, and/or other data types in a modulated data signal such as a carrier wave or other transport mechanism and includes any information delivery media. The term "modulated data signal" can refer to a signal that has one or more of its characteristics set or changed in such a manner as to encode information in the signal. By way of example, and not limitation, the computer storage media can include wired media such as a wired network or direct-wired connection, and wireless media such as acoustic, RF, infrared and other wireless media. Combinations of any of the above should also be included within the scope of computer-readable media.

The CPU(s) 706 can be configured to execute at least some of the computer-readable instructions to control one or more components of the computing device 700 to perform one or more of the methods and/or processes described herein. The CPU(s) 706 can each include one or more cores (e.g., one, two, four, eight, twenty-eight, seventy-two, etc.) that are capable of handling a multitude of software threads simultaneously. The CPU(s) 706 can include any type of processor, and can include different types of processors depending on the type of computing device 700 implemented (e.g., processors with fewer cores for mobile devices and processors with more cores for servers). For example, depending on the type of computing device 700, the processor can be an Advanced RISC Machines (ARM) processor implemented using Reduced Instruction Set Computing (RISC) or an x86 processor implemented using Complex Instruction Set Computing (CISC). The computing device 700 can include one or more CPUs 706 in addition to one or more microprocessors or supplementary co-processors, such as math co-processors.

In addition to or alternatively from the CPU(s) 706, the GPU(s) 708 can be configured to execute at least some of the computer-readable instructions to control one or more components of the computing device 700 to perform one or more of the methods and/or processes described herein. One or more of the GPU(s) 708 can be an integrated GPU (e.g., with one or more of the CPU(s) 706 and/or one or more of the GPU(s) 708 can be a discrete GPU. In embodiments, one or more of the GPU(s) 708 can be a coprocessor of one or more of the CPU(s) 706. The GPU(s) 708 can be used by the computing device 700 to render graphics (e.g., 3D graphics) or perform general purpose computations. For example, the GPU(s) 708 can be used for General-Purpose computing on GPUs (GPGPU). The GPU(s) 708 can include hundreds or thousands of cores that are capable of handling hundreds or thousands of software threads simultaneously. The GPU(s) 708 can generate pixel data for output images in response to rendering commands (e.g., rendering commands from the CPU(s) 706 received via a host interface). The GPU(s) 708 can include graphics memory, such as display memory, for storing pixel data or any other suitable data, such as GPGPU data. The display memory can be included as part of the memory 704. The GPU(s) 708 can include two or more GPUs operating in parallel (e.g., via a link). The link can directly connect the GPUs or can connect the GPUs through a switch. When combined together, each GPU 708 can generate pixel data or GPGPU data for different portions of an output or for different outputs (e.g., a first GPU for a first image and a second GPU for a second image). Each GPU can include its own memory, or can share memory with other GPUs.

In addition to or alternatively from the CPU(s) 706 and/or the GPU(s) 708, the logic unit(s) 720 can be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 can discretely or jointly perform any combination of the methods, processes and/or portions thereof. One or more of the logic units 720 can be part of and/or integrated in one or more of the CPU(s) 706 and/or the GPU(s) 708 and/or one or more of the logic units 720 can be discrete components or otherwise external to the CPU(s) 706 and/or the GPU(s) 708. In embodiments, one or more of the logic units 720 can be a coprocessor of one or more of the CPU(s) 706 and/or one or more of the GPU(s) 708.

Examples of the logic unit(s) 720 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 can include one or more receivers, transmitters, and/or transceivers that enable the computing device 700 to communicate with other computing devices via an electronic communication network, included wired and/or wireless communications. The communication interface 710 can include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 712 can enable the computing device 700 to be logically coupled to other devices including the I/O components 714, the presentation component(s) 718, and/or other components, some of which can be built in to (e.g., integrated in) the computing device 700. Illustrative I/O components 714 include a microphone, mouse, keyboard, joystick, game pad, game controller, satellite dish, scanner, printer, wireless device, etc. The I/O components 714 can provide a natural user interface (NUI) that processes air gestures, voice, or other physiological inputs generated by a user. In some instances, inputs can be transmitted to an appropriate network element for further processing. An NUI can implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 can be include depth cameras, such as stereoscopic camera systems, infrared camera systems, RGB camera systems, touchscreen technology, and combinations of these, for gesture detection and recognition. Additionally, the computing device 700 can include accelerometers or gyroscopes (e.g., as part of an inertia measurement unit (IMU)) that enable detection of motion. In some examples, the output of the accelerometers or gyroscopes can be used by the computing device 700 to render immersive augmented reality or virtual reality.

The power supply 716 can include a hard-wired power supply, a battery power supply, or a combination thereof. The power supply 716 can provide power to the computing device 700 to enable the components of the computing device 700 to operate.

The presentation component(s) 718 can include a display (e.g., a monitor, a touch screen, a television screen, a heads-up-display (HUD), other display types, or a combination thereof), speakers, and/or other presentation components. The presentation component(s) 718 can receive data from other components (e.g., the GPU(s) 708, the CPU(s) 706, etc.), and output the data (e.g., as an image, video, sound, etc.).

Network environments suitable for use in implementing embodiments of the disclosure can include one or more client devices, servers, network attached storage (NAS), other backend devices, and/or other device types. The client devices, servers, and/or other device types (e.g., each device) can be implemented on one or more instances of the computing device(s) 700 of FIG. 7—e.g., each device can include similar components, features, and/or functionality of the computing device(s) 700.

Components of a network environment can communicate with each other via a network(s), which can be wired, wireless, or both. The network can include multiple networks, or a network of networks. By way of example, the network can include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) can provide wireless connectivity.

Compatible network environments can include one or more peer-to-peer network environments—in which case a server might not be included in a network environment— and one or more client-server network environments—in which case one or more servers can be included in a network environment. In peer-to-peer network environments, functionality described herein with respect to a server(s) can be implemented on any number of client devices.

In at least one embodiment, a network environment can include one or more cloud-based network environments, a distributed computing environment, a combination thereof, etc. A cloud-based network environment can include a framework layer, a job scheduler, a resource manager, and a distributed file system implemented on one or more of servers, which can include one or more core network servers and/or edge servers. A framework layer can include a framework to support software of a software layer and/or one or more application(s) of an application layer. The software or application(s) can respectively include web-based service software or applications. In embodiments, one or more of the client devices can use the web-based service software or applications (e.g., by accessing the service software and/or applications via one or more application programming interfaces (APIs)). The framework layer can be, but is not limited to, a type of free and open-source software web application framework such as that can use a distributed file system for large-scale data processing (e.g., "big data").

A cloud-based network environment can provide cloud computing and/or cloud storage that carries out any combination of computing and/or data storage functions described herein (or one or more portions thereof). Any of these various functions can be distributed over multiple locations from central or core servers (e.g., of one or more data centers that can be distributed across a state, a region, a country, the globe, etc.). If a connection to a user (e.g., a client device) is relatively close to an edge server(s), a core server(s) can designate at least a portion of the functionality to the edge server(s). A cloud-based network environment can be private (e.g., limited to a single organization), can be public (e.g., available to many organizations), and/or a combination thereof (e.g., a hybrid cloud environment).

The client device(s) can include at least some of the components, features, and functionality of the example computing device(s) 700 described herein with respect to FIG. 7. By way of example and not limitation, a client device can be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure can be practiced in a variety of system configurations, including hand-held devices, consumer electronics, general-purpose computers, more specialty computing devices, etc. The disclosure can also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" can include only element A, only element B, only element C, element A and element B, element A and element C, element B and element C, or elements A, B, and C. In addition, "at least one of element A or element B" can include at least one of element A, at least one of element B, or at least one of element A and at least one of element B. Further, "at least one of element A and element B" can include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

What is claimed is:

1. A computer-implemented method for selecting a target object, the method comprising:
    determining a targeting area for a player avatar within a user interface based on a direction of a touch gesture received via a touch screen;
    responsive to a detected termination of the touch gesture and a determination that a duration of the touch gesture is below a duration threshold—
    determining a targeting subarea for the player avatar within the targeting area, the targeting subarea being determined based at least in part on a distance of the touch gesture,
    selecting a target object from a set of objects located within the targeting subarea, and
    providing for display within the user interface an indication that the target object is selected.

2. The method of claim 1, further comprising:
    responsive to a determination that a duration of the touch gesture is above a duration threshold, causing display of a focus point reticle.

3. The method of claim 1, wherein the targeting subarea dynamically adjusts in size and shape based on the distance of the touch gesture.

4. The method of claim 3, wherein the size and shape of the targeting subarea increases as the distance between the player avatar and the targeting subarea increases.

5. The method of claim 1, wherein the duration threshold is defined by a number of game logic frames.

6. The method of claim 1, wherein selecting a target object from a set of objects located within the targeting subarea further comprises:
    accessing object data associated with each of the set of objects; and
    determining that the target object is part of a class of objects available for selection within the targeting subarea.

7. The method of claim 1, wherein determining a targeting subarea within the targeting area is limited by a selected interaction type.

8. A non-transitory computer storage medium storing computer-usable instructions that, when used by one or more computing devices, cause the one or more computing devices to perform operations comprising:
    activating a focus point reticle within a user interface based on a touch gesture received at a first control location of a touch screen;
    moving a position of the focus point reticle from a player avatar within the user interface to a different location within the user interface based on a detected movement of the touch gesture;
    determining a targeting area of the player avatar based on a direction of the different location from the player avatar; and responsive to a detected termination of the touch gesture at the second control location and a determination that a duration of the touch gesture is below a duration threshold—
  determining a first targeting subarea within the targeting area, the first targeting subarea being determined based at least in part on a distance between the different location and the player avatar,
  selecting a target object from a set of objects located within the targeting subarea, and
  providing for display an indication that the target object is selected.

9. The computer storage medium of claim 8, further comprising:
  responsive to a determination that a duration of the touch gesture is above a duration threshold, causing display of a focus point reticle.

10. The computer storage medium of claim 8, wherein the first targeting subarea dynamically adjusts in size based on the distance of the touch gesture.

11. The computer storage medium of claim 10, wherein the size of the first targeting subarea increases as the distance between the player avatar and the first targeting subarea increases.

12. The computer storage medium of claim 8, wherein the duration threshold is defined by a number of game logic frames.

13. The computer storage medium of claim 8, wherein selecting a target object from a set of objects located within the targeting subarea further comprises:
  accessing object data associated with each of the set of objects; and
  determining that the target object is part of a class of objects available for selection within the targeting subarea.

14. The computer storage medium of claim 8, wherein determining a first targeting subarea within the targeting area is limited by a selected interaction type.

15. A system comprising:
  at least one processor, and
  at least one storage medium storing computer-usable instructions that, when used by the at least one processor, cause the at least one processor to perform operations comprising:
    activating a focus point reticle positioned on a player avatar within a user interface, the focus point reticle being activated based on a touch gesture received at a first control location of a touch screen;
    moving a position of the focus point reticle from the player avatar to a different location within the user interface based on movement of the touch gesture from the first control location to a second control location of the touch screen;
    determining a targeting area of the player avatar based on a direction of the different location from the player avatar; and
    responsive to a detected termination of the touch gesture at the second control location and a determination that a duration of the touch gesture is below a duration threshold—
      determining a first targeting subarea within the targeting area, the first targeting subarea being determined based at least in part on a distance between the different location and the player avatar,
      selecting a target object from a set of objects located within the targeting subarea, and
      providing for display an indication that the target object is selected.

16. The system of claim 15, further comprising:
  responsive to a determination that a duration of the touch gesture is above a duration threshold, causing display of a focus point reticle.

17. The system of claim 15, wherein the first targeting subarea dynamically adjusts in size based on the distance of the touch gesture.

18. The system of claim 17, wherein the size of the first targeting subarea increases as the distance between the player avatar and the first targeting subarea increases.

19. The system of claim 15, wherein the duration threshold is defined by a number of game logic frames.

20. The system of claim 15, wherein selecting a target object from a set of objects located within the targeting subarea further comprises:
  accessing object data associated with each of the set of objects; and
  determining that the target object is part of a class of objects available for selection within the targeting subarea.

* * * * *